United States Patent
Swaminathan et al.

(10) Patent No.: US 9,338,580 B2
(45) Date of Patent: May 10, 2016

(54) METHOD AND APPARATUS FOR PACKET LOSS RATE-BASED CODEC ADAPTATION

(71) Applicant: QUALCOMM Incorporated, San Diego, CA (US)

(72) Inventors: Arvind Swaminathan, San Diego, CA (US); Srinivasan Balasubramanian, San Diego, CA (US); Thomas Klingenbrunn, San Diego, CA (US); Samir V. Ginde, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 13/654,351

(22) Filed: Oct. 17, 2012

(65) Prior Publication Data

US 2014/0105041 A1  Apr. 17, 2014

Related U.S. Application Data

(60) Provisional application No. 61/550,330, filed on Oct. 21, 2011.

(51) Int. Cl.
*G01R 31/08* (2006.01)
*G06F 11/00* (2006.01)
(Continued)

(52) U.S. Cl.
CPC .............. *H04W 4/00* (2013.01); *H04L 47/263* (2013.01); *H04L 47/38* (2013.01); *H04W 28/0236* (2013.01)

(58) Field of Classification Search
CPC ..... H04L 43/16; H04L 43/0829; H04L 12/26; H04L 29/02; H04W 72/1231
USPC ................................................. 370/252, 310
See application file for complete search history.

(56) References Cited

U.S. PATENT DOCUMENTS

| 7,002,992 B1 | 2/2006 | Shaffer et al. |
| 7,643,414 B1 | 1/2010 | Minhazuddin |

(Continued)

FOREIGN PATENT DOCUMENTS

| EP | 1168732 A1 | 1/2002 |
| EP | 1725060 A1 | 11/2006 |

(Continued)

OTHER PUBLICATIONS

3GPP TS 26.114 V11.1.0 (Sep. 2011), 3rd Generation Partnership Project; Technical Specification Group Services and System Aspects; IP Multimedia Subsystem (IMS); Multimedia Telephony; Media handling and interaction (Release 11).

(Continued)

*Primary Examiner* — Jeffrey M Rutkowski
*Assistant Examiner* — Voster Preval
(74) *Attorney, Agent, or Firm* — Arent Fox LLP

(57) ABSTRACT

A method, an apparatus, and a computer program product for wireless communication are provided where, at a first wireless node, a weighted average of a frame loss rate is determined for a plurality of frames transmitted from a second wireless node using a first codec; feedback is transmitted to the second wireless node based at least in part on the frame loss rate; and one or more frames are received from the second wireless node using a second codec, responsive to transmitting the feedback. Also, transmitting from a first wireless node a plurality of frames to a second wireless node using a first codec; receiving frame loss rate information from the second wireless node responsive to the transmitting; selecting a second codec, based at least in part on the frame loss rate information, and transmitting a second plurality of frames to the second wireless node using the second codec.

64 Claims, 13 Drawing Sheets

(51) Int. Cl.
| | |
|---|---|
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04B 7/00* | (2006.01) |
| *H04W 4/00* | (2009.01) |
| *H04W 28/02* | (2009.01) |
| *H04L 12/811* | (2013.01) |
| *H04L 12/825* | (2013.01) |

(56) References Cited

U.S. PATENT DOCUMENTS

| | | | |
|---|---|---|---|
| 7,808,988 B2 | 10/2010 | Neff | |
| 7,860,005 B2* | 12/2010 | Cakareski et al. | 370/235 |
| 7,860,509 B2 | 12/2010 | Hakansson et al. | |
| 2002/0004841 A1 | 1/2002 | Sawatari | |
| 2003/0109278 A1 | 6/2003 | Cavalli et al. | |
| 2004/0042398 A1* | 3/2004 | Peleg | H04L 12/5695 370/230 |
| 2004/0105463 A1 | 6/2004 | Cheung et al. | |
| 2005/0058145 A1* | 3/2005 | Florencio | G10L 19/005 370/412 |
| 2005/0169312 A1* | 8/2005 | Cakareski et al. | 370/473 |
| 2006/0045057 A1* | 3/2006 | Nylander et al. | 370/338 |
| 2006/0050623 A1 | 3/2006 | Hartman, Jr. et al. | |
| 2006/0069533 A1* | 3/2006 | Florea et al. | 703/1 |
| 2006/0069553 A1* | 3/2006 | Hakansson et al. | 704/222 |
| 2007/0011277 A1* | 1/2007 | Neff et al. | 709/218 |
| 2007/0124143 A1* | 5/2007 | Geller | 704/240 |
| 2007/0195749 A1* | 8/2007 | Kakimoto | 370/352 |
| 2009/0124211 A1 | 5/2009 | Itoh et al. | |
| 2009/0170499 A1* | 7/2009 | Vaisanen | H04L 1/20 455/423 |
| 2009/0268730 A1 | 10/2009 | Sanjeewa | |
| 2009/0327844 A1 | 12/2009 | Suneya | |
| 2010/0082834 A1 | 4/2010 | Joung et al. | |
| 2010/0232297 A1* | 9/2010 | Johansson et al. | 370/241 |
| 2010/0233397 A1* | 9/2010 | Al-Mutawa | B32B 9/02 428/35.6 |
| 2014/0105041 A1* | 4/2014 | Swaminathan et al. | 370/252 |

FOREIGN PATENT DOCUMENTS

| | | |
|---|---|---|
| EP | 2262148 A2 | 12/2010 |
| JP | H0923212 A | 1/1997 |
| JP | 2001320440 A | 11/2001 |
| JP | 2005260649 A | 9/2005 |
| JP | 2009212842 A | 9/2009 |
| JP | 2010288277 A | 12/2010 |
| KR | 20040008192 A | 1/2004 |
| KR | 20090017445 A | 2/2009 |
| WO | 0016513 A1 | 3/2000 |

OTHER PUBLICATIONS

Ramakrishnan, K. et al., "The Addition of Explicit Congestion Notification (ECN) to IP", Network Working Group, Standards Track, RFC 3168, pp. 1-63, The Internet Society, Sep. 2001.

Editor 1: "Draft—PSS/MMS Audio Codec Selection, Criteria and Test Outline—Version 0.2", 3GPP Draft; S4-030182, 3rd Generation Partnership Project (3GPP), Mobile Competence Centre; 650, Route Des Lucioles; F-06921 Sophia-Antipolis Cedex; France, vol. SA WG4, No. Berlin, Germany; Mar. 2, 2003, XP050285850.

Herre, J. et al "MPEG-4 high-efficiency AAC coding" IEEE Signal Processing Magazine, IEEE Service Center, Piscataway, NJ, US, vol. 25, No. 3, May 2008, pp. 137-142, XP011207727.

International Search Report—PCT/US2012/060879—ISA/EPO—May 3, 2013.

Jeong H., et al., "Integrated model for performance analysis of all-optical multihop packet switches", Applied Optics, vol. 39, Issue 26 (2000), Sep. 10, 2000, pp. 4770-4782, XP055047781.

Kazmi M., et al., "Admission control strategy and scheduling algorithms for downlink packet transmission in WCDMA", Vehicular Technology Conference, 2000, IEEE VTS Fall VTC 2000, 52nd Sep. 24-28, 2000, Piscataway, NJ, USA, IEEE, vol. 2, Sep. 24, 2000, pp. 674-680, XP010525465, ISBN: 978-0-7803-6507-0.

Translation of Office Action for Japanese Patent Application No. 2014-537256 dated May 12, 2015, 9 pages.

"Notice to File a Response for Korean Application No. 10-2014-7013680 dated Nov. 9, 2015, 6 pages."

Translation of Decision of Rejection for Japanese Application No. 2014-537256 dated Sep. 8, 2015, 7 pages.

\* cited by examiner

METHOD AND APPARATUS FOR PACKET LOSS RATE-BASED CODEC ADAPTATION

CROSS-REFERENCE TO RELATED APPLICATION(S)

This application claims the benefit of U.S. Provisional Application Ser. No. 61/550,330, entitled "Method And Apparatus for Packet Loss Rate-Based Codec Adaptation" and filed on Oct. 21, 2011, which is expressly incorporated by reference herein in its entirety.

BACKGROUND

1. Field

The present disclosure relates generally to communication systems, and more particularly, to a method and apparatus for packet loss rate-based codec adaptation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Systems, methods and apparatus are described which optimize adaptation of codecs used in video and voice communications, including, for example, voice over LTE (VoLTE), or other video or voice over data implementations. Adaptation may include changing from a first coder-decoder (codec) to a second, lower rate encoder in order to accomplish higher throughput.

In an aspect of the disclosure, a plurality of frames is transmitted from a first wireless node to a second wireless node using a first audio or video codec. Frame loss rate information is received from the second wireless node in response to the transmitted plurality of frames and a second audio or video codec is selected based at least in part on the frame loss rate information. A second plurality of frames may then be transmitted to the second wireless node using the second codec.

In an aspect of the disclosure, a the second codec is selected by comparing the frame loss rate to first and second thresholds and providing the results of the comparison of the frame loss rate to the thresholds as the feedback. The one or more frames may be transmitted using the second codec in response to the comparison. The frame loss rate information may comprise a request to use the second codec.

In an aspect of the disclosure, a weighted average of a frame loss rate is determined at a first wireless node for a plurality of frames transmitted from a second wireless node using a first codec. Feedback is transmitted to the second wireless node based, at least in part on the frame loss rate, and one or more frames from the second wireless node are received using a second codec, in response to the feedback.

In an aspect of the disclosure, the frame loss rate is compared to a first threshold and a second threshold, and the feedback comprises a result of the comparison. The one or more frames may be received using the second codec in response to the comparison.

In an aspect of the disclosure, identification of the second codec is received from the second wireless node based on the feedback. The frame loss rate may be based on a number of frames lost over a period of time. The number of frames lost may comprise frames from the second wireless node that are either not received or received beyond an allowed delay.

In an aspect of the disclosure, the second codec may be optimized for a higher transmission rate compared to the first codec if the frame loss rate is below the second threshold. The second codec may be optimized for a lower transmission rate compared to the first codec if the frame loss rate is above the first threshold.

In an aspect of the disclosure, one or more of the thresholds may comprise a hysteresis factor. At least one of the thresholds may be chosen based on an expected frame loss rate for a codec associated with a change in codecs.

In an aspect of the disclosure, the weighted average of the frame loss rate may comprise a weighted sum of the number of frames lost over a plurality of periods. The plurality of periods may range from earlier periods to later periods, and the weighted sum may emphasize the number of frames lost during the later periods.

In an aspect of the disclosure, the weighted average of the frame loss rate may be adjusted upon detection of a silence mode. The comparison of the frame loss rate to the thresholds may be based on the adjusted frame loss rate.

In an aspect of the disclosure, a rate at which a radio access network responds to issues at the radio link may be estimated, and the period of time may be determined based at least in part on the estimated rate. The period of time may be at least an order of magnitude greater than a period corresponding to the estimated rate.

In an aspect of the disclosure, at least one of the thresholds may be selected based on an expected mean opinion score for a particular codec at an expected frame loss rate associated with the particular codec. At least one of the codecs may be selected such that the current mean opinion score for the first codec at the weighted average of the frame loss rate is equal to the expected mean opinion score for a particular codec at an expected frame loss rate associated with the particular codec. Adjusting the determination may comprise adjusting the number of samples and determining a length of the silent mode.

DETAILED DESCRIPTION

Figure 1:
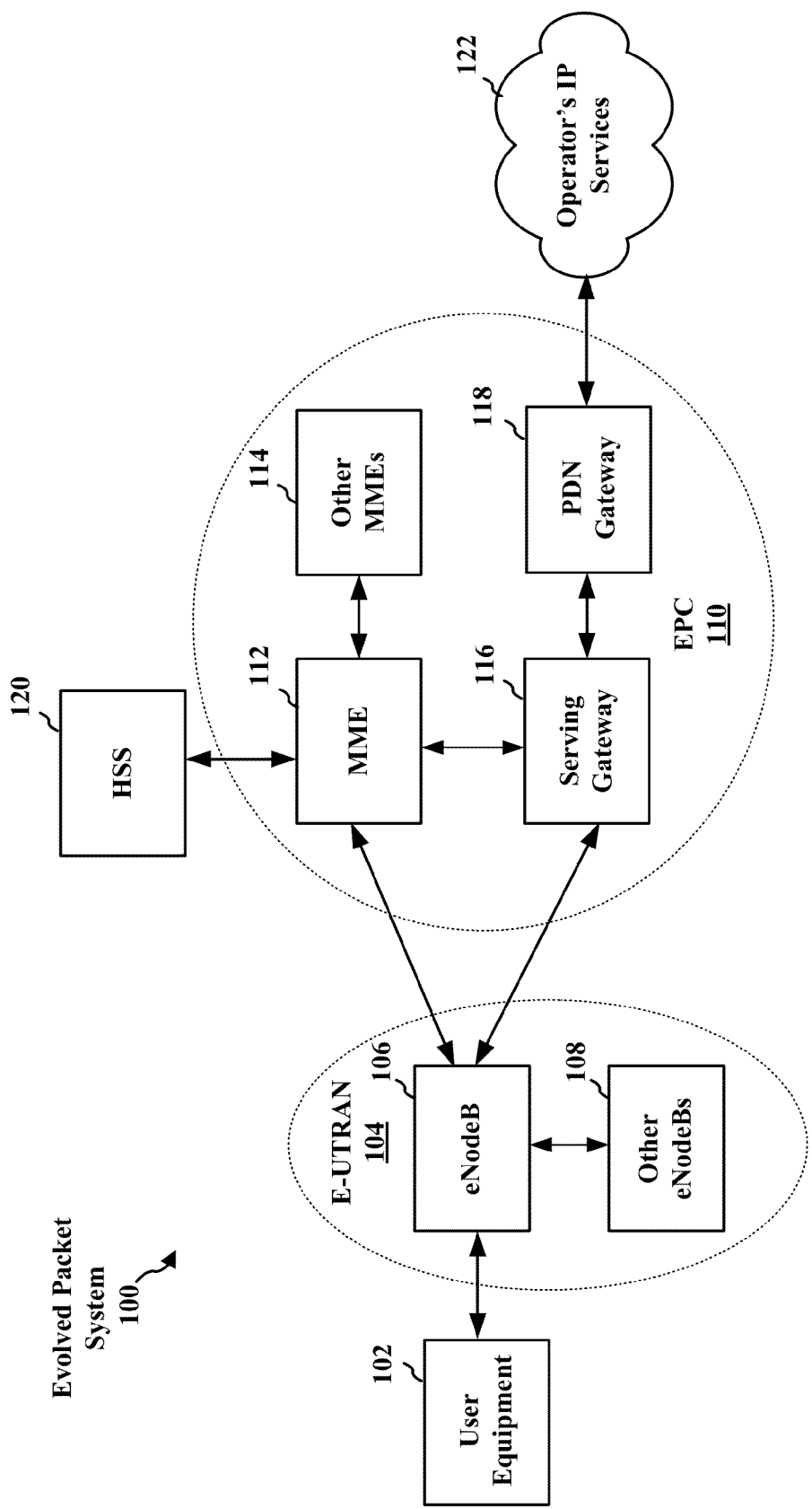
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g. an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
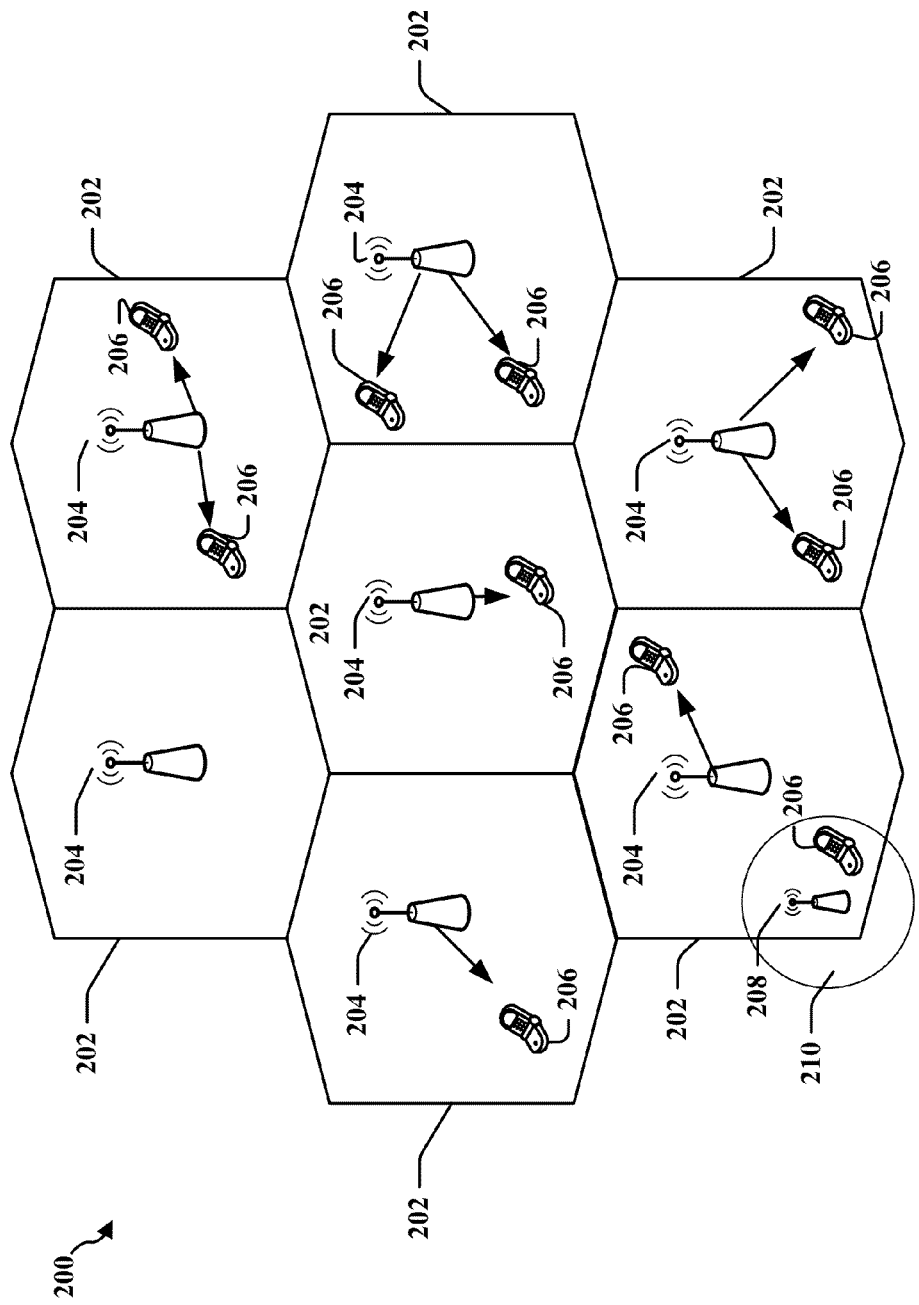
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
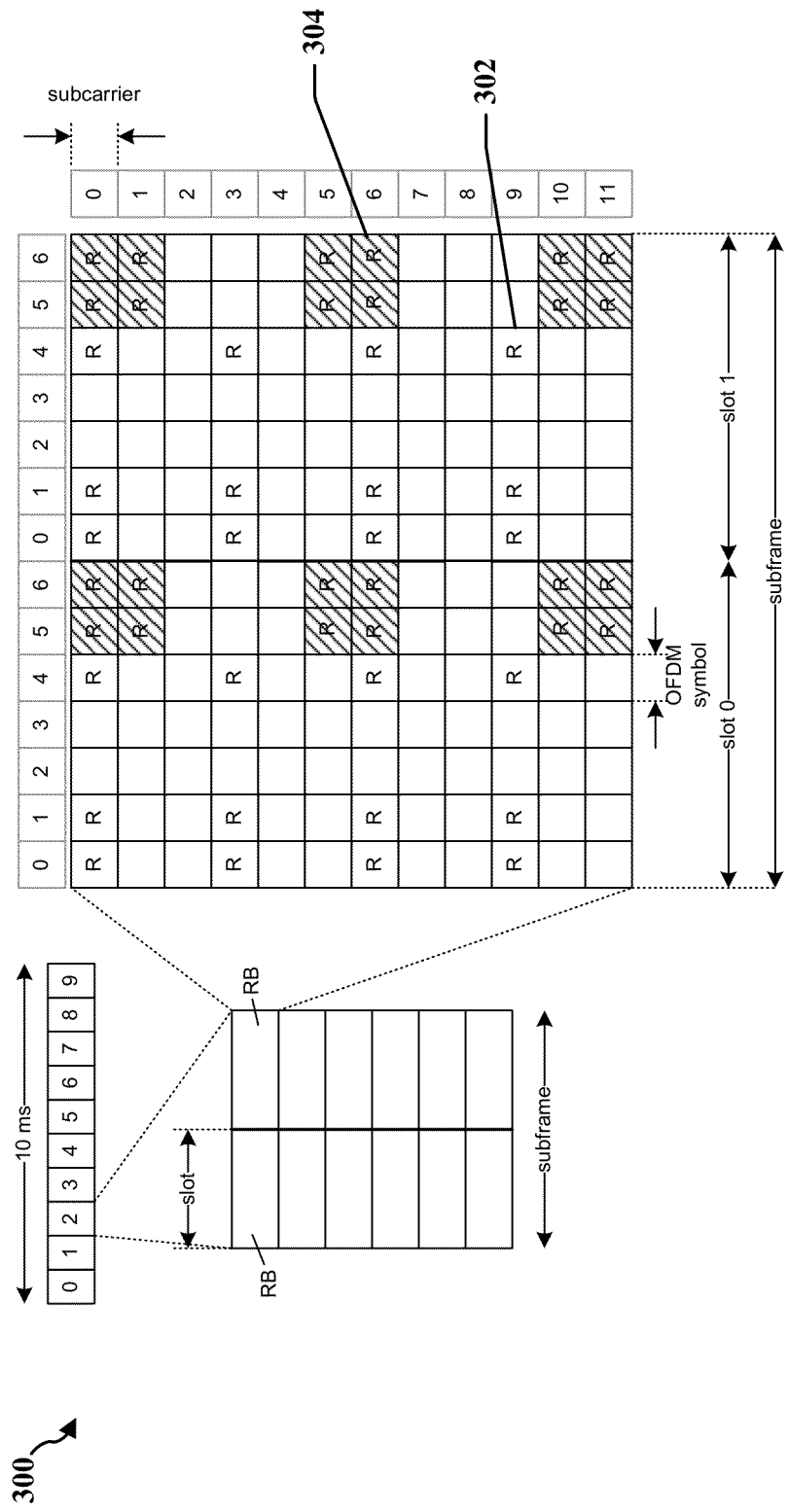
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
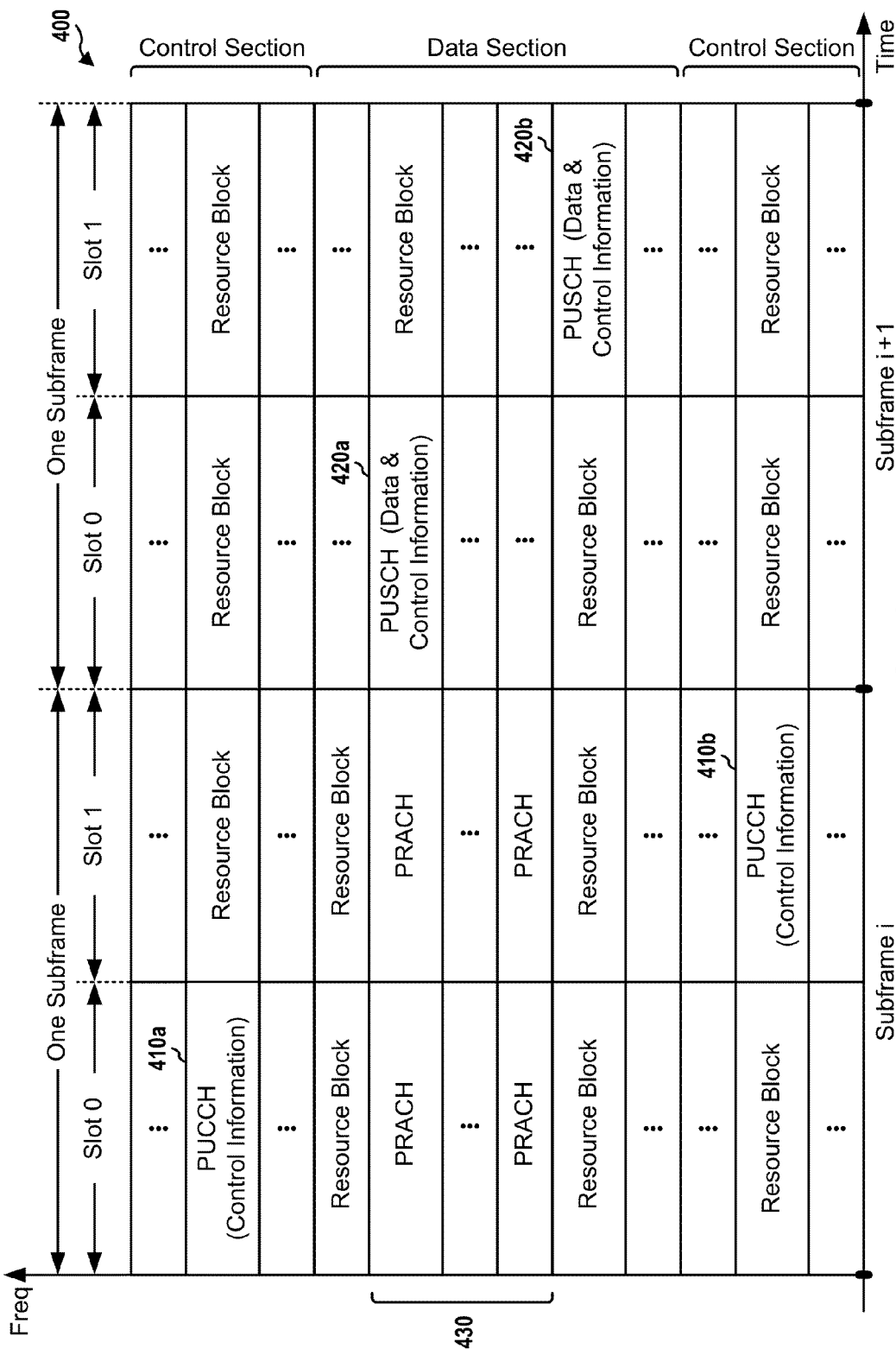
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
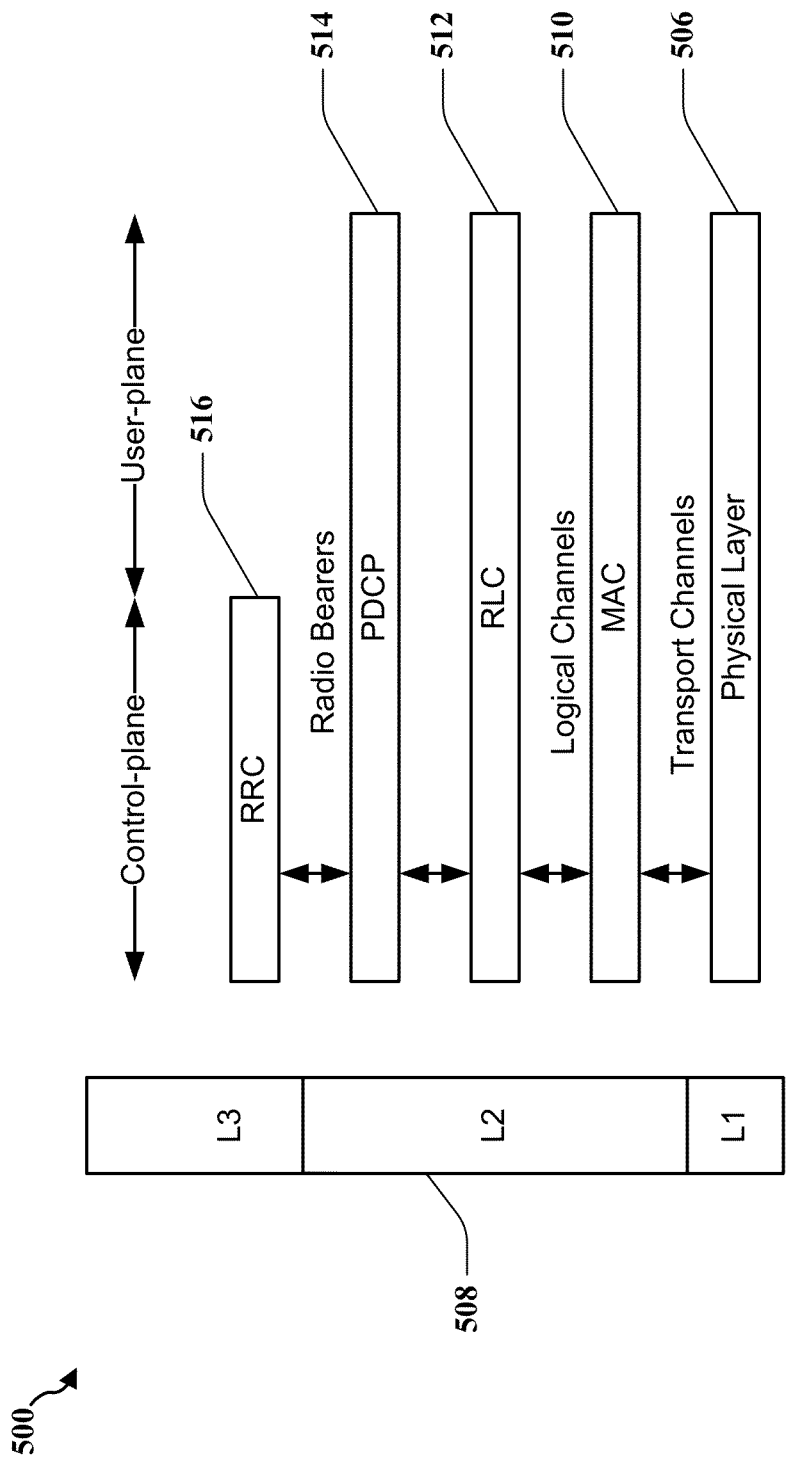
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
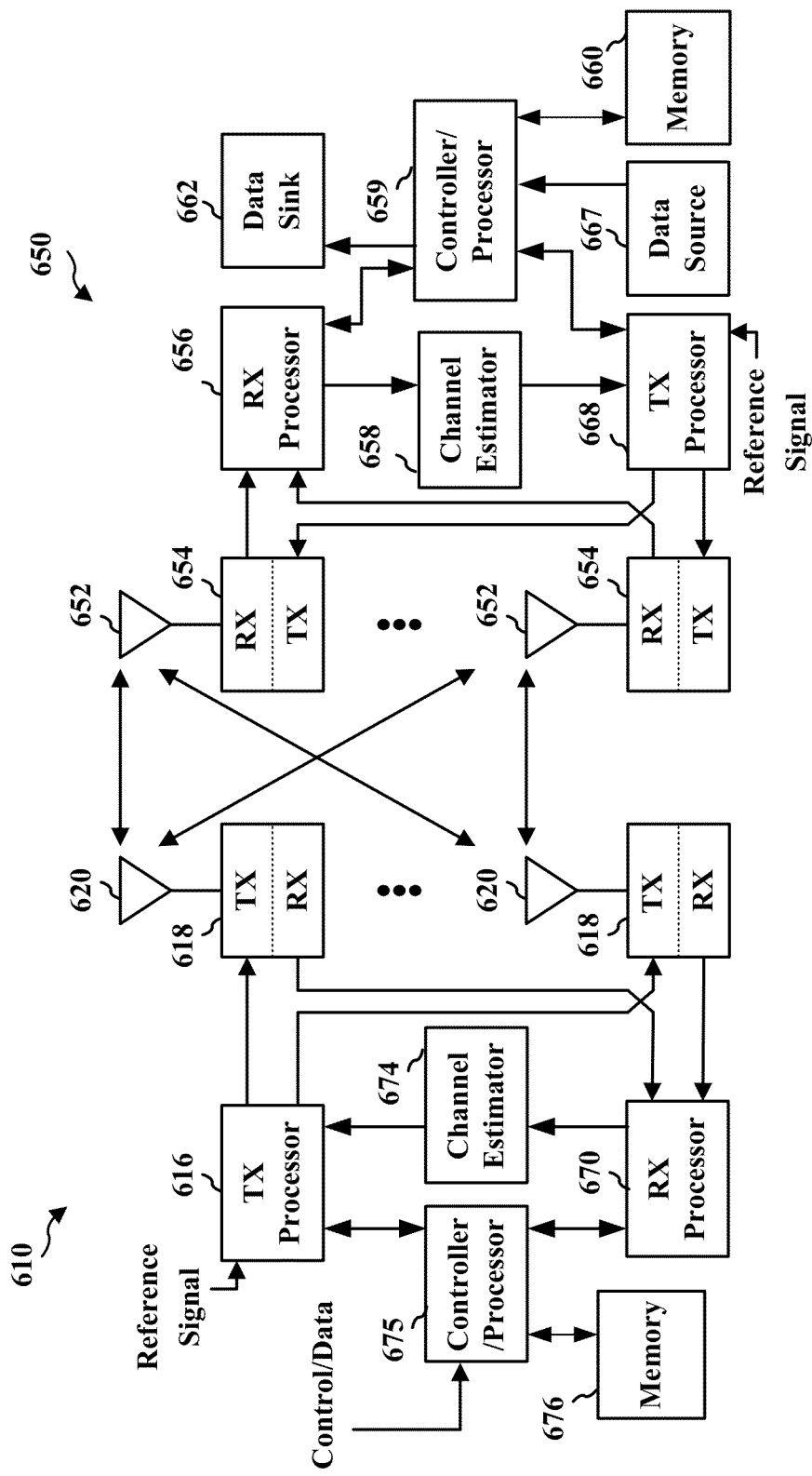
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In some implementations, LTE is provided in an IP cellular system for the sole purpose of carrying data, and voice and other traffic is handled by falling-back or otherwise reverting to a different radio access network, such as a 2G or 3G system. Video and voice may be carried as data traffic over an LTE network. For example, VoLTE may be employed to deliver voice and messaging services on LTE and VoLTE provides network operators with a standardized system for transferring voice traffic over and between LTE radio access networks. VoLTE supports voice communications directly, without the need to fallback to use a different network technology. In other examples, voice may be carried using VoIP and one or more video over data schemes may be used with LTE. One or more codecs may be used to encode and decode video and voice traffic for transmission and reception between two nodes in a VoLTE network, or in another packet data network. More than one codec may be used, and a set of codecs may be predefined, negotiated or otherwise agreed upon between the two nodes. Each codec in the set of codecs may be optimized for a particular transmission rate. For example, a particular codec may provide better voice transmission quality at a higher transmission rate than another codec.

Typically, a specific codec to be used for a voice call is negotiated before or during call initiation. Rate adaptation may occur during the voice call, when channel conditions change for example. Changed channel conditions may result in a change of codec to obtain a higher encoding rate. The adaptation may be triggered as a result of measurement of a packet loss rate (PLR). In some embodiments, an increased PLR may lead to the use of a lower rate codec, while a decreased PLR may lead to the use of a higher rate codec.

Certain embodiments provide systems, methods and apparatus that enable improved rate adaptation based on PLR. It will be appreciated that while one or more of the examples herein refer to voice communications, the systems and methods described herein may also be used for video communications or other types of communications. Many wireless communication system using codecs may benefit from the systems and methods described herein.

Figure 8:
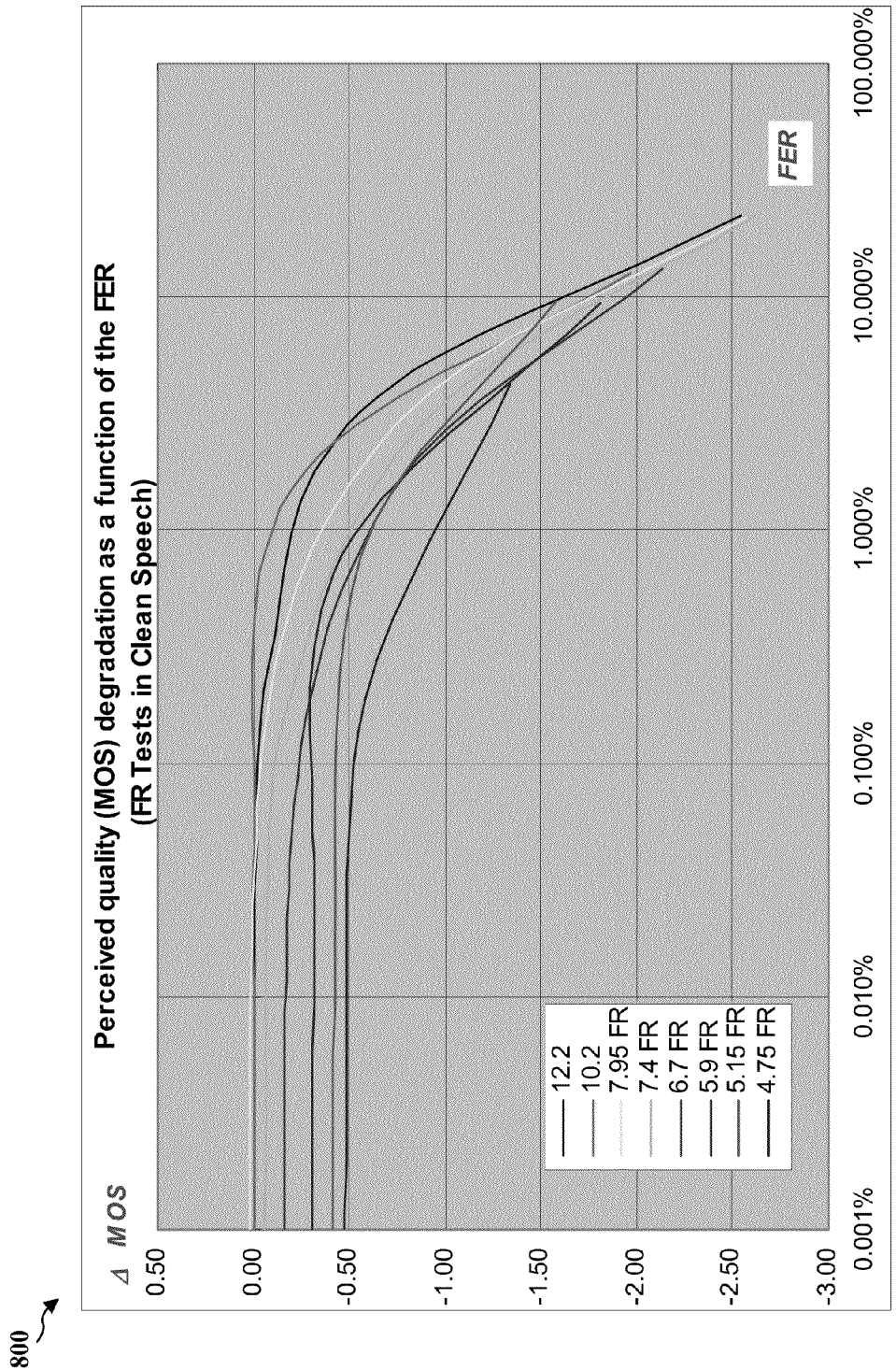
FIG. 8 is a graph plotting mean opinion score degradation as a function of frame error rate.

In a system using VoLTE, the receiver of a media stream may trigger rate adaptation when it starts to experience high PLR. An increased PLR can affect a subjective quality metric, referred to as Mean Opinion Score (MOS). MOS is commonly used to rate phone service speech quality, expressed on a scale from 1 to 5, where 5 is best. A score of 4 is normally considered "Toll Quality," for calls placed over PSTN/TDM networks. MOS ratings may be a function of many factors, including the type of network and codec or codecs used with the network, wiring and premises equipment, and even the handset used to place the call. When first introduced, MOS was determined using subjective listening tests, whereby a panel of trained experts judged recorded speech samples and assigned an averaged score. Test equipment may now be used to calculate MOS using sophisticated algorithms that are designed to closely approximate the results of subjective listening tests. FIG. 8 illustrates a plot of MOS degradation as a function of a Frame Error Rate (FER). It should be noted that the terms "frame" and "packet" are used interchangeably and those skilled in the art should understand that the differences in such use is minor with respect to the systems, methods and apparatus disclosed herein.

PLR may change for a variety of reasons and, after a certain PLR has been reached, a crossover occurs such that the current rate codec has a lower MOS than the MOS expected, or observed, for an available lower rate codec under the same channel conditions. The crossover may occur when the lower rate codec offers a significantly lower PLR than the higher rate codec. In some examples, the lower rate codec may have a PLR that approaches, or reaches, zero. When a crossover situation is determined to have occurred, switching to a lower codec rate can improve call quality. Typically, however, the PLR that will be experienced with a lower rate codec is unknown prior to switching to the lower rate codec.

Certain embodiments employ a PLR-based adaptation mechanism which can avoid decreasing the codec rate when a decrease is not needed or desirable. In some embodiments, the PLR-adaptation mechanism comprises systems, methods, and apparatus that enable a device to adapt its codec rate to the current conditions in the network during an existing call in order to maintain an acceptable call quality. Accordingly, a feedback channel may be provided between the end-points of a communication channel or connection. In some embodiments, parameter tuning is used to identify a correct crossover point for PLR-based adaptation. In some embodiments, the media sending rate may be decreased on a time scale which is an order of magnitude larger than the time scale used by an eNB to react to link-level issues. In one example, a larger adaptation interval is selected and used when a RAN operator does not provide explicit feedback regarding timescales used for link-adaptation.

Figure 7:
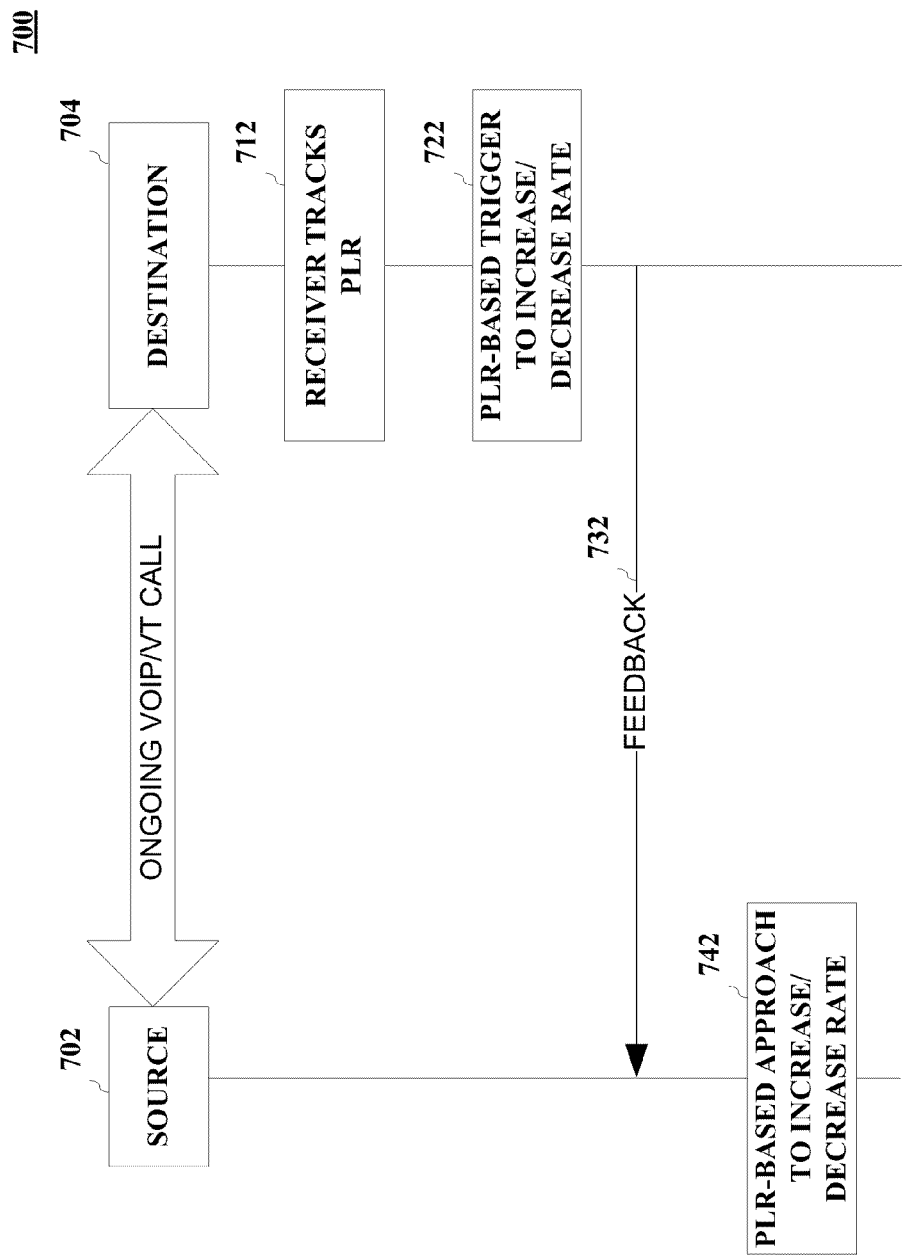
FIG. 7 is a diagram illustrating a rate adaption process for codec selection based on packet loss rate.

FIG. 7 illustrates a PLR-based adaptation algorithm usable in an ongoing voice over Internet Protocol (VoIP) or video telephony (VT) call between a source 702 and a destination 704. The algorithm may use a weighted PLR as a trigger for rate increases and/or decreases at 722. Source 702 and destination 704 may comprise, or be embodied in, any suitable device configurable to receive and/or initiate VoIP or VT calls. Source 702 may comprise one or more transmitters that communicate content to one or more receivers of destination 704. At 712, the destination 704 may track the PLR at the receiver at 712. At some predetermined threshold PLR, an increase or decrease of codec rate may be triggered and the destination 704 may transmit feedback to the source 702 at 732. For example, one threshold may define a maximum PLR such that, when a measured or observed PLR exceeds the threshold, a change in codec rate may be indicated and/or executed. Feedback may be transmitted through Real-Time Transport Protocol (RTP), which defines a standardized packet format for delivering audio and video over internet protocol (IP) networks. The feedback may also be transmitted through Real-Time Transport Control Protocol (RTCP), which provides out-of-band statistics and control information for an RTP flow. In some embodiments, codec rate may be increased or decreased based on changes in PLR at step 742, and after the feedback has been transmitted.

In some embodiments, a rate adaptation algorithm takes into account a timescale associated with the PLR, using weighted averages of samples, such that more recent samples are emphasized. The algorithm may adapt the codec rate when MOS crossover points are reached. As described herein, the time scale associated with the PLR and/or changes in PLR may be set such that the algorithm adapts codec at a rate that is an order of magnitude lower than the adaptation rate used at the eNB. In some embodiments, weighted averages may be used to group errors that occurred when the same "MAC/PHY" parameters were used. Groups of errors that occurred further out in time may be weighed based on correspondence of MAC/PHY parameters used.

In some embodiments, codec adaption may be performed in anticipation or expectation of MOS crossover. PLR thresholds used as triggers for decreasing adaptation may be based on the crossover points identified in one or more MOS characteristics (see the curves in FIG. 8).

In some embodiments, PLR-based adaptation systems, methods and apparatus may be configured to take account of silence intervals. A silence interval may be a period of time during which no speech is detected. Frames corresponding to silence intervals may be sent at very low rates. In one example, silence interval frames are sent once every 160 ms. Accordingly, an adaptation metric may be employed that is based on a "minimum" number of samples in addition to a "minimum" time to ensure sufficient averaging. In one example, the loss of silence frames are assigned greater weight than the loss of regular, or normal rate frames. Successfully received silence frames may be assigned a lower weight lower than received regular frames.

Figure 9:
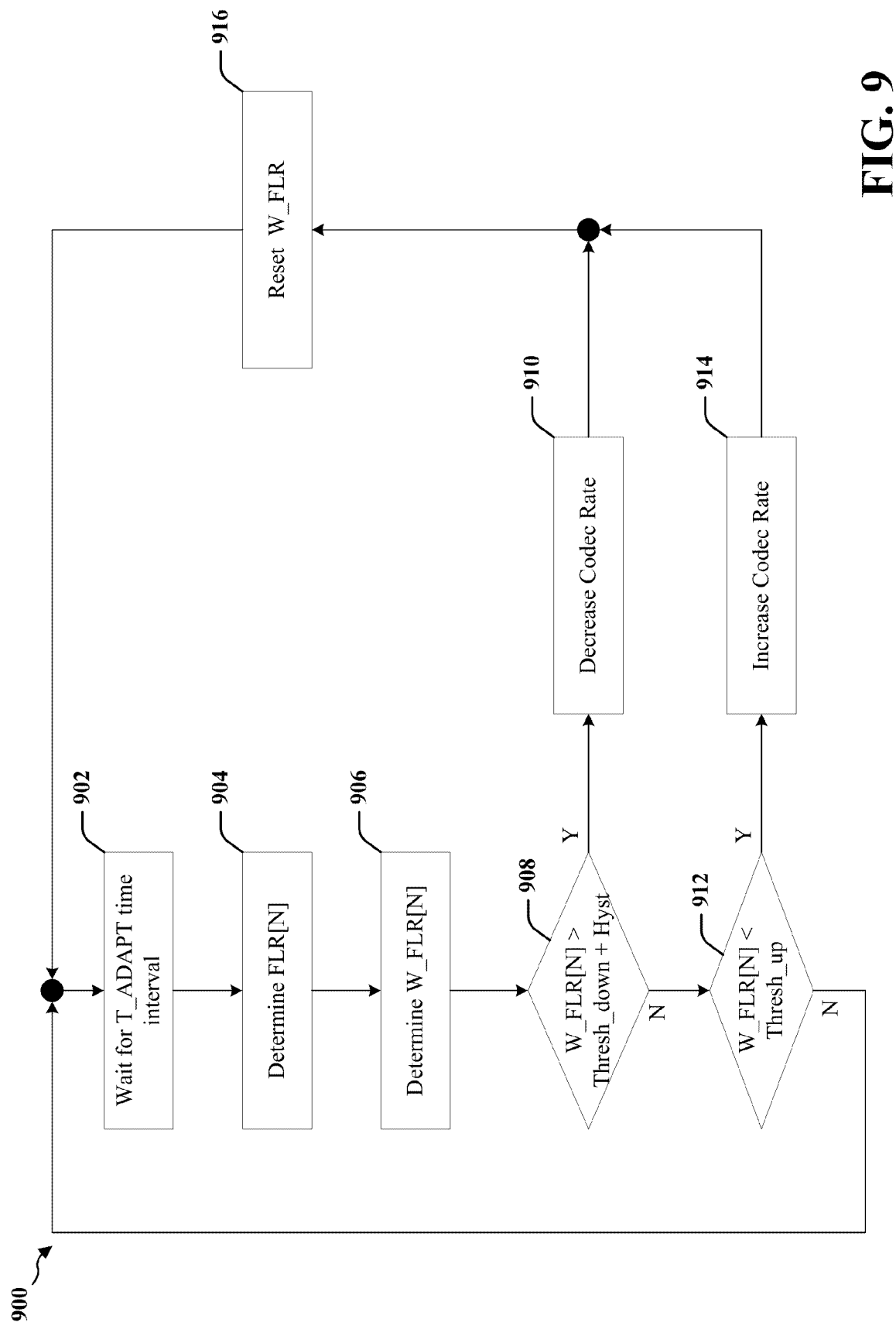
FIG. 9 is a flow chart of a rate adaption process for codec selection based on packet loss rate.

FIG. 9 illustrates a PLR-based adaptation process 900 employed in certain embodiments. At step 902, time is split into intervals or periods of length T_adapt, and each T_adapt. T_adapt may be considered a measure of how fast an eNB reacts to link issues on a VoIP bearer. In one example, T_adapt has a default value of 1 second.

At step 904, the percentage of frames lost in the N'th period (FLR[N]) is determined. A frame may be considered to be lost if the frame is not received or if the frame arrives too late for playback. For example, a frame may considered to be lost if the frame is received after a maximum permitted delay. In some embodiments, FLR[N] may be determined by determining the percentage of frames that could not be delivered when a decoder requested the frame at the output of a de jitter buffer.

At step 906, a weighted FLR[N] (W_FLR[N]) is determined. W_FLR[N] may be a weighted sum of the last N_ave periods, and may be defined as:

$$W\_FLR[N] = \sum_{i=0}^{N\_ave-1} \alpha^i * FLR[N-i]$$

where α is used to de-emphasize errors that occurred during earlier T_adapt periods and where:

N_ave=5 when normal PLR based adaptation is being used, or

N_ave=10 when conservative PLR based adaptation is being used; and

α=0.95.

At step 908, it is determined if W_FLR is greater than a modified first threshold value, Thresh_down plus HysteresisFactor. If the W_FLR is greater, then the codec rate may be decreased at step 910. In one example, a default Thresh_down is set to 2% for a conservative implementation. In another example, the value of Thresh_down may be set to 5%, or higher. In some embodiments, HysteresisFactor is set to 1 if the last codec rate increase was performed within the last (2*N_ave) samples; otherwise HysteresisFactor may be set to 0.

At step 912, it is determined if W_FLR is lower than Thresh_up. When lower, then the codec rate may be increased at step 914. In some embodiments, the default value for Thresh_up is 1%.

After a codec rate change, the W_FLR may be reset to 0 at step 916. In some embodiments, the W_FLR test is performed only after N_ave samples have been fed into the filter after initialization or reset. Accordingly, a complete set of new data is collected before W_FLR is tested. The value of N_ave may be selected according to implementation and may be set to 5 or 10, for example.

In certain embodiments, the thresholds Thresh_up and Thresh_down are chosen based on the crossover points illustrated in the graph of FIG. 8. Threshold values may be selected based on currently used codec rate (mode) and neighboring or next closest codec modes in the set of codecs negotiated between transmitter and receiver.

In certain embodiments, the thresholds Thresh_up and Thresh_down are chosen based on estimated MOS. In one example, a UE may use a certain codec mode, M_curr, where the next higher and next lower codec modes are M_high and M_low, respectively. The PLR for the next highest codec mode may be calculated as PLR_scale_high*(PLR of the current codec mode). The default PLR_scale_high may be set to 2, based on the assumption that the system can attain twice the current PLR after switching to a higher codec. The PLR with next lowest codec mode may be assumed to be PLR_scale_low*(PLR of the current codec mode). The default PLR_scale_low may be set to ½, based on the assumption that the current PLR may be halved after the system switches to a lower codec. Thus:

Thresh_down may be set to a PLR such that

MOS(M_curr,PLR)<MOS(M_low,
PLR_scale_low*PLR), and

Thresh_up may be set to a PLR such that $$MOS(M\_curr, PLR) < MOS(M\_high, PLR\_scale\_high*PLR).$$

In certain embodiments, the adaptation process operates in a "Silence Mode" after detecting the start of a silence period. In one example, the silence period may be detected based on the receipt of a Silence Descriptor (SID) frame. Certain adjustments made in Silence Mode may include:
1. For each successful frame reception:
    Parameter N_frames is incremented by ½
    Note: FLR=N_frames_lost/N_frames; and
2. For each unsuccessful frame reception:
    Parameter N_frames is incremented by 1; and
    Parameter N_frames_lost is incremented by 1.5.

In order to account for the decrease in number of samples, the Nth FLR sample, FLR[N], may calculated only if two conditions are both satisfied:
1. Time since last calculation>T_adapt; and
2. N_frames>N_adapt,
where the default N_adapt=10.

Figure 10:
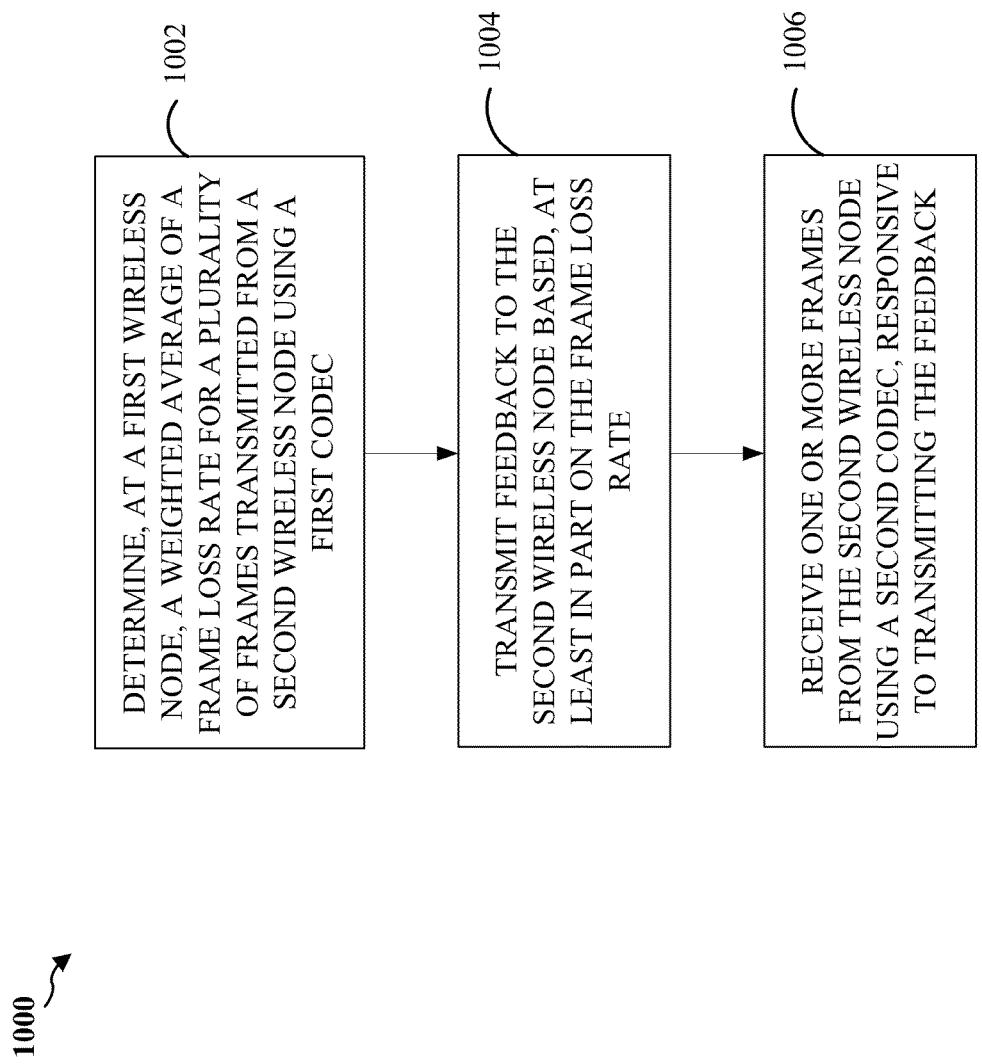
FIG. 10 is a flow chart of a rate adaption process for codec selection based on packet loss rate.

FIG. 10 is a flow chart 1000 of a rate adaption process for codec selection based on packet loss rate. The method may be performed by a wireless node.

At step 1002, the wireless node determines a weighted average of a frame loss rate for a plurality of frames transmitted from a second wireless node using a first codec. The frame loss rate may be based on a number of frames lost over a period of time. The number of frames lost may comprise frames from the second wireless node that are either not received or received beyond an allowed delay. The weighted average of the frame loss rate may comprise a weighted sum of the number of frames lost over a plurality of periods. The plurality of periods may range from earlier periods to later periods. The weighted sum may be weighted to emphasize the number of frames lost during the later periods.

In some embodiments, a determined or measured frame loss rate may be adjusted based on detection or determination of a silence mode. The adjusted frame loss rate may be compared a first threshold and a second threshold. The determined frame loss rate may be adjusted by adjusting the number of samples and determining a length of the silent mode. The determined frame loss rate may be adjusted by adjusting the determination comprises adjusting the number of samples and determining a length of the silent mode At step 1004, the wireless node transmits feedback to the second wireless node based, at least in part on the frame loss rate. In some embodiments, the wireless node compares the frame loss rate to a first threshold and a second threshold and the feedback may comprise a result of the comparison of the frame loss rate to the first second thresholds.

At step 1006, the wireless node receives one or more frames from the second wireless node using a second codec, in response to transmitting the feedback. The received frames may be received using the second codec based on the comparison of the frame loss rate to the first threshold and the second threshold. The first and second codecs may be optimized for different transmission rates. One or more of the first threshold and the second threshold may comprise a hysteresis factor. One or more of the first threshold and the second threshold may be chosen based on an expected frame loss rate for a codec that may be a candidate for selection when changing codecs. One or more of the first and second thresholds may be selected based on an expected MOS for a candidate codec at an expected frame loss rate associated with the candidate codec.

In some embodiments, identification of the second codec is received from the second wireless node based on the feedback. The second codec may be optimized for a higher transmission rate compared to the first codec if the frame loss rate is below the second threshold. The second codec may be optimized for a lower transmission rate compared to the first codec if the frame loss rate is above the first threshold.

In some embodiments, at least one of codecs is selected such that the current MOS for the first codec at the weighted average of the frame loss rate is equal to the expected MOS for a particular codec at an expected frame loss rate associated with the particular codec.

In some embodiments, the wireless node estimates a rate at which a radio access network responds to issues at the radio link and determines the period of time based at least in part on the estimated rate. The period of time may be at least an order of magnitude greater than a period corresponding to the estimated rate.

Figure 11:
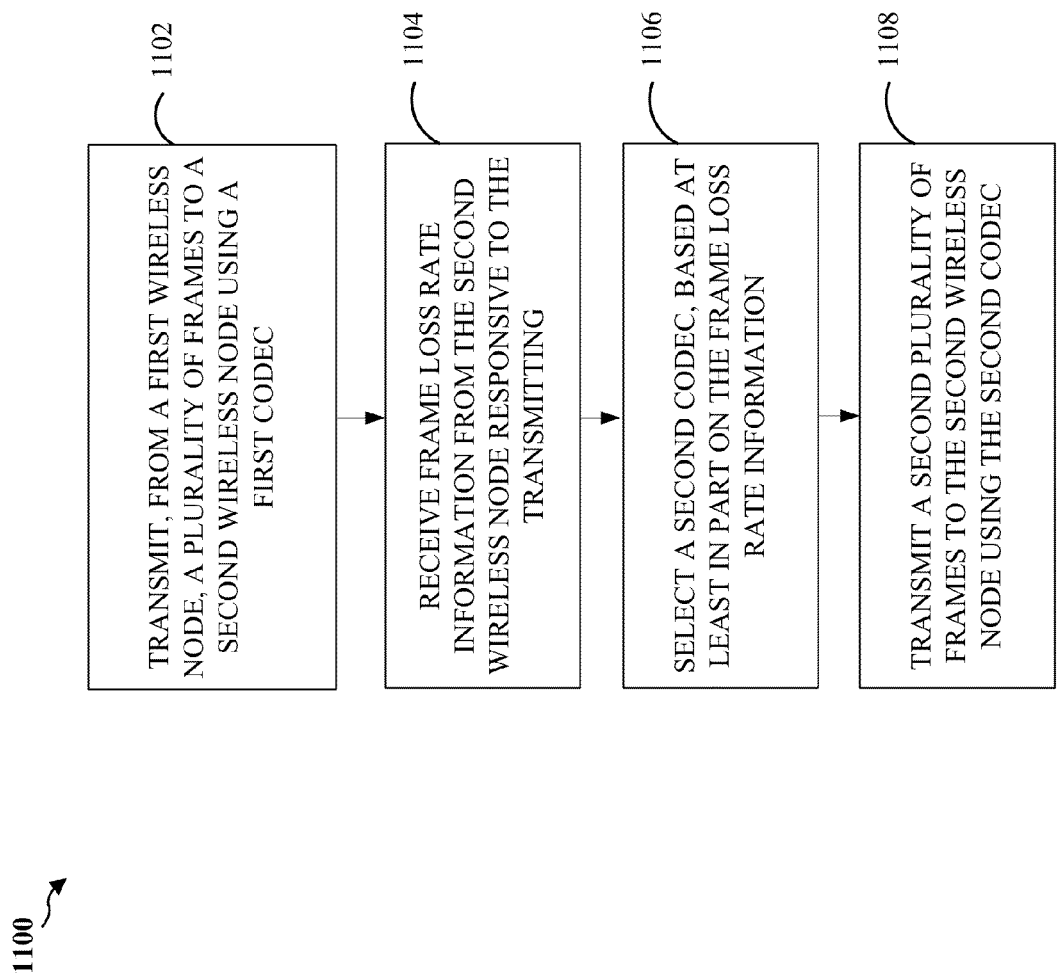
FIG. 11 is a flow chart of a rate adaption process for codec selection based on packet loss rate.

FIG. 11 is a flow chart 1100 of a rate adaption process for codec selection based on packet loss rate. The method may be performed by a wireless node. At step 1102, the wireless node transmits a plurality of frames to a second wireless node using a first codec. At step 1104, the wireless node receives frame loss rate information from the second wireless node responsive to the frames to the second wireless node. Further, at step 1106, the wireless node selects a second codec, based at least in part on the frame loss rate information. At step 1108, the wireless node transmits a second plurality of frames to the second wireless node using the second codec determines a weighted average of a frame loss rate for a plurality of frames transmitted from a second wireless node using a first codec.

Figure 12:
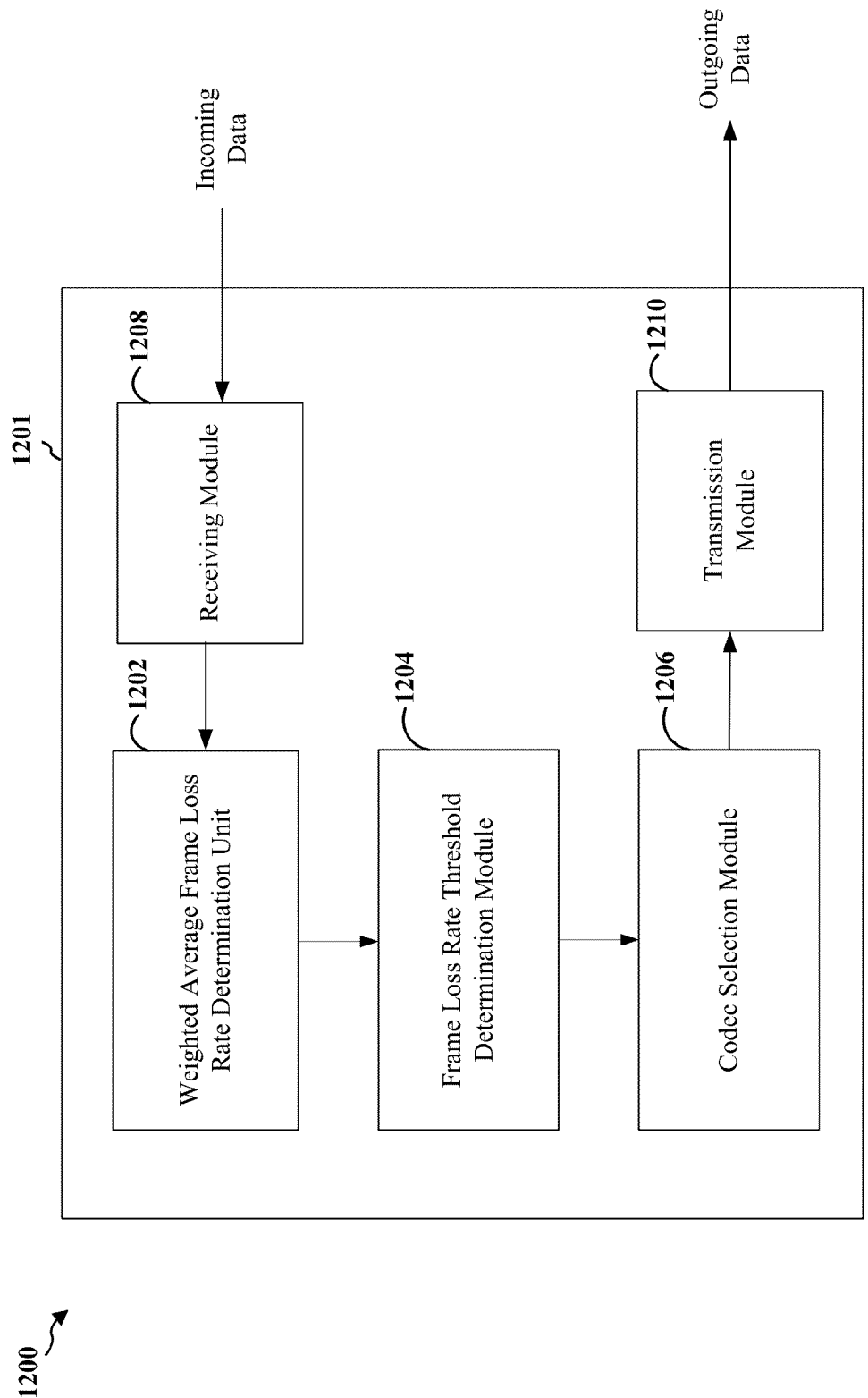
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 100. The apparatus 1201 includes a module 1202 that determines a weighted average of a frame loss rate for a plurality of frames transmitted from a second wireless node using a first codec, a module 1204 that compares the frame loss rate to a first threshold and a second threshold, a module 1206 that selects a codec to be used as the first codec, a module 1208 that receives one or more frames from the second wireless node using a second codec, responsive to transmitting the feedback, and a module 1210 that transmits feedback to the second wireless node based, at least in part on the frame loss rate.

The apparatus may include additional modules that perform each of the steps of the algorithm in the aforementioned flow charts FIGS. 9, 10, and 11. As such, each step in the aforementioned flow charts FIGS. 9, 10, and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
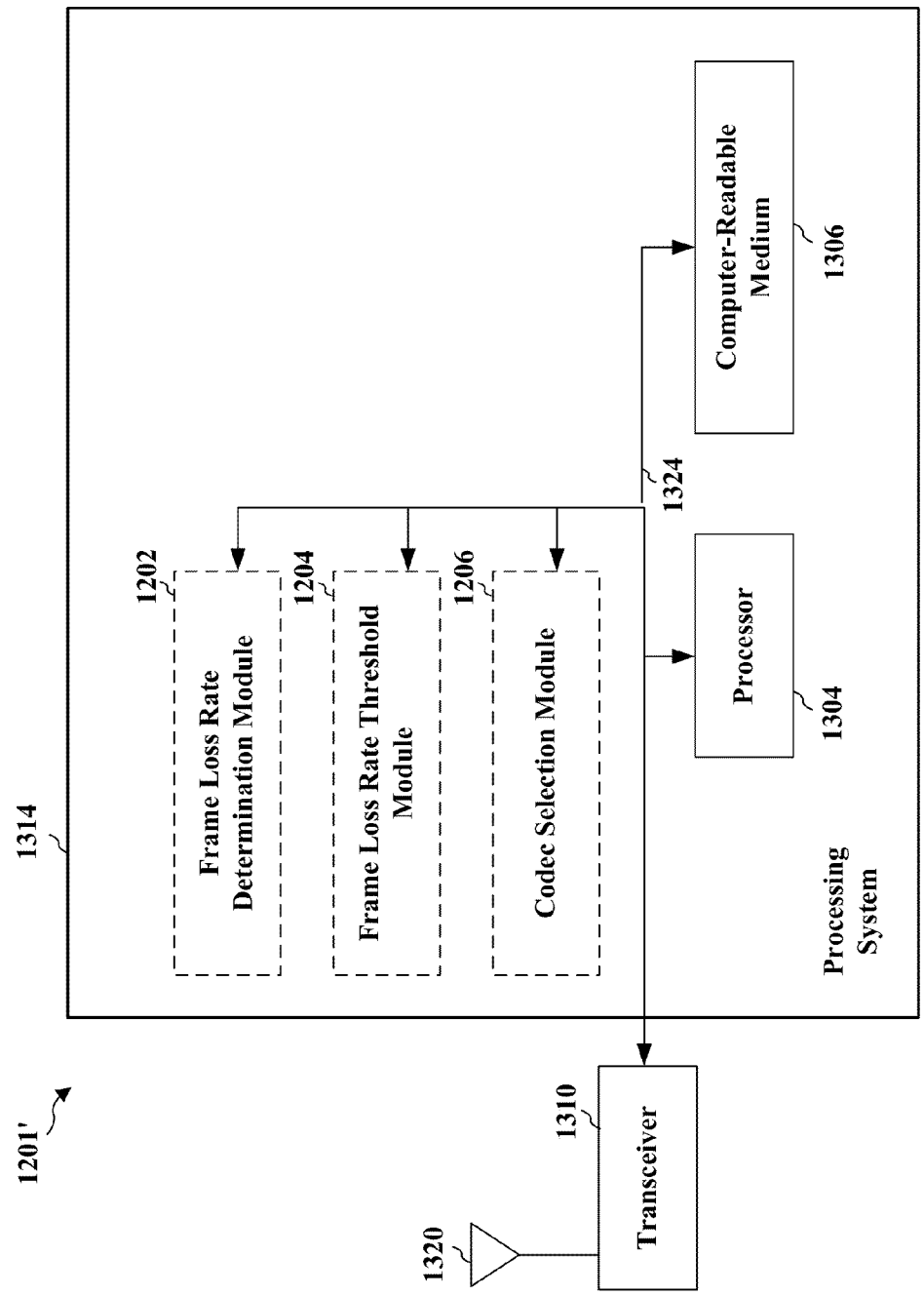
FIG. 13 is a diagram illustrating an example of a hardware implementation for an apparatus employing a processing system.

FIG. 13 is a diagram illustrating an example of a hardware implementation for an apparatus 1201' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1202, 1204, 1206, 1208, 1210, and the computer-readable medium 1306. The bus 1324 may also link various other circuits such as timing sources, peripherals, voltage regulators, and power management circuits, which are well known in the art, and therefore, will not be described any further.

The apparatus includes a processing system 1314 coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes modules 1202, 1204, and 1206. The modules may be software modules running in the processor 1304, resident/stored in the computer readable medium 1306, one or more hardware modules coupled to the processor 1304, or some combination thereof. The processing system 1314 may be a component of the eNB 610 and may include the memory 676 and/or at least one of the TX processor 616, the RX processor 670, and the controller/processor 675. The processing system 1314 may also be a component of the UE 650 and may include the memory 660 and/or at least one of the TX processor 668, the RX processor 656, and the controller/processor 659.

In one configuration, the apparatus 100/100' for wireless communication includes means for determining a weighted average of a frame loss rate for a plurality of frames transmitted from a wireless node using a first codec; means for comparing the frame loss rate to a first threshold and a second threshold; and means for communicating at a second codec with the wireless node after the frame loss rate is above the first threshold or below the second threshold. The aforementioned means may be one or more of the aforementioned modules of the apparatus 100 and/or the processing system 1314 of the apparatus 100' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In another configuration, the apparatus 100/100' for wireless communication includes the aforementioned means. The aforementioned means may be one or more of the aforementioned modules of the apparatus 100 and/or the processing system 1314 of the apparatus 100' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining, at a first wireless node, a weighted average frame loss rate for a plurality of frames received, from a second wireless node, using a first audio or video codec of a first codec rate in N periods, N being an integer greater than 1, wherein the weighted average frame loss rate is a weighted sum of N respective frame loss rates of the N periods for the plurality of frames, and wherein the weighted average frame loss rate of a first period of the N periods is assigned a weight that is greater than a weight assigned to the weighted average frame loss late of a second period of the N periods that is prior to the first period;
   transmitting feedback to the second wireless node based, at least in part, on the weighted average frame loss rate, the feedback including a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold; and
   receiving one or more frames from the second wireless node using the second audio or video codec responsive to transmitting the feedback, wherein the first audio or video codec and the second audio or video codec are optimized for different transmission rates,
   wherein a frame transmitted by the second wireless node that is received at the first wireless node beyond an allowed delay is considered to be lost, and
   wherein a frame transmitted by the second wireless node using the first audio or video codec that is not received at the first wireless node is considered to be lost, wherein the first wireless node is capable of receiving one or more frames using the first audio or video codec.

2. The method of claim 1, further comprising:
   estimating a link-adaptation rate at which a radio access network responds to radio link-level issues; and
   determining a duration of each period of the N periods based at least in part on the estimated link-adaptation rate.

3. The method of claim 2, wherein the N periods are at least an order of magnitude greater than a period corresponding to the estimated link-adaptation rate.

4. The method of claim 1, wherein N is an integer greater than 2, and wherein the frame loss rate in a given period of the N periods is assigned a weight that is greater than a respective weight assigned to the respective frame loss late in each period of the N periods that is prior to the given period.

5. The method of claim 1, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

6. The method of claim 5, further comprising comparing the weighted average frame loss rate to the first threshold and to the second threshold.

7. The method of claim 6, further comprising receiving identification of the second codec from the second wireless node in response to the feedback.

8. The method of claim 6, wherein the second codec is optimized for a higher transmission rate compared to the first codec if the weighted average frame loss rate is below the second threshold.

9. The method of claim 6, wherein the second codec is optimized for a lower transmission rate compared to the first codec if the weighted average frame loss rate is above the first threshold.

10. The method of claim 6, wherein at least one of the first threshold and the second threshold comprises a hysteresis factor.

11. The method of claim 6, wherein at least one of the first threshold and the second threshold is chosen based on an expected frame loss rate for a codec that is a candidate for a change in codecs.

12. The method of claim 6, further comprising
detecting a silence mode; and
adjusting the weighted average frame loss rate based on the silence mode,
wherein the comparisons of the weighted average frame loss rate to the first threshold and the second threshold are based on the adjusted weighted average frame loss rate.

13. The method of claim 12, wherein adjusting the weighted average frame loss rate comprises adjusting a number of samples and determining a length of the silence mode.

14. An apparatus for wireless communication, comprising:
means for determining, at a first wireless node, a weighted average frame loss rate for a plurality of frames received, from a second wireless node, using a first audio or video codec in N periods, N being an integer greater than 1, wherein the weighted average frame loss rate is a weighted sum of N respective frame loss rates of the N periods for the plurality of frames, and wherein the weighted average frame loss rate of a first period of the N periods is assigned a weight that is greater than a weight assigned to the weighted average frame loss late of a second period of the N periods that is prior to the first period;
means for transmitting feedback to the second wireless node based, at least in part on the weighted average frame loss rate, the feedback including a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold; and
means for receiving one or more frames from the second wireless node using the second audio or video codec, responsive to transmitting the feedback, wherein the first audio or video codec and the second audio or video codec are optimized for different transmission rates,
wherein a frame transmitted by the second wireless node that is received at the first wireless node beyond an allowed delay is considered to be lost, and
wherein a frame transmitted by the second wireless node using the first audio or video codec that is not received at the first wireless node is considered to be lost, wherein the first wireless node is capable of receiving one or more frames using the first audio or video codec.

15. The apparatus of claim 14, further comprising:
means for estimating a link-adaptation rate at which a radio access network responds to radio link-level issues; and
means for determining a duration of each period of the N periods based at least in part on the estimated link-adaptation rate.

16. The apparatus of claim 15, wherein the N periods are at least an order of magnitude greater than a period corresponding to the estimated link-adaptation rate.

17. The apparatus of claim 14, wherein N is an integer greater than 2, and wherein the frame loss rate in a given period of the N periods is assigned a weight that is greater than a respective weight assigned to the respective frame loss late in each period of the N periods that is prior to the given period.

18. The apparatus of claim 14, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

19. The apparatus of claim 18, further comprising means for comparing the weighted average frame loss rate to the first threshold and to the second threshold.

20. The apparatus of claim 19, further comprising means for receiving identification of the second codec from the second wireless node in response to the feedback.

21. The apparatus of claim 19, wherein the second codec is optimized for a higher transmission rate compared to the first codec if the weighted average frame loss rate is below the second threshold.

22. The apparatus of claim 19, wherein the second codec is optimized for a lower transmission rate compared to the first codec if the weighted average frame loss rate is above the first threshold.

23. The apparatus of claim 19, wherein at least one of the first threshold and the second threshold comprises a hysteresis factor.

24. The apparatus of claim 19, wherein at least one of the first threshold and the second threshold is chosen based on an expected frame loss rate for a codec that is a candidate for a change in codecs.

25. The apparatus of claim 19, further comprising
means for detecting a silence mode; and
means for adjusting the weighted average frame loss rate based on the silence mode,
wherein the comparisons of the weighted average frame loss rate to the first threshold and the second threshold are based on the adjusted frame loss rate.

26. The apparatus of claim 25, wherein the means for adjusting the weighted average frame loss rate is further configured to adjust a number of samples and determining a length of the silence mode.

27. A non-transitory computer-readable medium comprising code to:
determine, at a first wireless node, a weighted average frame loss rate for a plurality of frames received, from a second wireless node, using a first audio or video codec in N periods, N being an integer greater than 1, wherein the weighted average frame loss rate is a weighted sum of N respective frame loss rates of the N periods for the plurality of frames, and wherein the weighted average frame loss rate of a first period of the N periods is assigned a weight that is greater than a weight assigned to the weighted average frame loss late of a second period of the N periods that is prior to the first period;
transmit feedback to the second wireless node based, at least in part on the weighted average frame loss rate, the feedback including a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold; and
receive one or more frames from the second wireless node using the second audio or video codec, responsive to transmitting the feedback, wherein the first audio or video codec and the second audio or video codec are optimized for different transmission rates,
wherein a frame transmitted by the second wireless node that is received at the first wireless node beyond an allowed delay is considered to be lost, and
wherein a frame transmitted by the second wireless node using the first audio or video codec that is not received at the first wireless node is considered to be lost, wherein the first wireless node is capable of receiving one or more frames using the first audio or video codec.

28. The non-transitory computer-readable medium of claim 27, further comprising code to:
estimate a link-adaptation rate at which a radio access network responds to radio link-level issues; and
determine a duration of each period of the N periods based at least in part on the estimated link-adaptation rate.

29. The non-transitory computer-readable medium of claim 28, wherein the N periods are at least an order of magnitude greater than a period corresponding to the estimated link-adaptation rate.

30. The non-transitory computer-readable medium of claim 27, wherein N is an integer greater than 2, and wherein the frame loss rate in a given period of the N periods is assigned a weight that is greater than a respective weight assigned to the respective frame loss late in each period of the N periods that is prior to the given period.

31. The non-transitory computer-readable medium of claim 27, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

32. The non-transitory computer-readable medium of claim 31, further comprising code to compare the weighted average frame loss rate to the first threshold and to the second threshold.

33. The non-transitory computer-readable medium of claim 32, further comprising code to receive identification of the second audio or video codec from the second wireless node in response to the feedback.

34. The non-transitory computer-readable medium of claim 32, wherein the second audio or video codec is optimized for a higher transmission rate compared to the first audio or video codec if the weighted average frame loss rate is below the second threshold.

35. The non-transitory computer-readable medium of claim 32, wherein the second audio or video codec is optimized for a lower transmission rate compared to the first audio or video codec if the weighted average frame loss rate is above the first threshold.

36. The non-transitory computer-readable medium of claim 32, wherein at least one of the first threshold and the second threshold comprises a hysteresis factor.

37. The non-transitory computer-readable medium of claim 32, wherein at least one of the first threshold and the second threshold is chosen based on an expected frame loss rate for a codec that is a candidate for a change in codecs.

38. The non-transitory computer-readable medium of claim 32, further comprising code to:
detect a silence mode; and
adjust the weighted average frame loss rate based on the silence mode,
wherein the comparisons of the weighted average frame loss rate to the first threshold and the second threshold are based on the adjusted frame loss rate.

39. The non-transitory computer-readable medium of claim 38, wherein the code to adjust the weighted average frame loss rate comprises code is further configured to adjust a number of samples and determining a length of the silence mode.

40. An apparatus for wireless communication, comprising:
a memory; and
at least one processor coupled to the memory and configured to:
determine, at a first wireless node, a weighted average frame loss rate for a plurality of frames received, from a second wireless node, using a first audio or video codec in N periods, N being an integer greater than 1, wherein the weighted average frame loss rate is a weighted sum of N respective frame loss rates of the N periods for the plurality of frames, and wherein the weighted average frame loss rate of a first period of the N periods is assigned a weight that is greater than a weight assigned to the weighted average frame loss late of a second period of the N periods that is prior to the first period;
transmit feedback to the second wireless node based, at least in part on the weighted average frame loss rate, the feedback including a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold; and receive one or more frames from the second wireless node using the second audio or video codec, responsive to transmitting the feedback, wherein the first audio or video codec and the second audio or video codec are optimized for different transmission rates, wherein a frame transmitted by the second wireless node that is received at the first wireless node beyond an allowed delay is considered to be lost, and wherein a frame transmitted by the second wireless node using the first audio or video codec that is not received at the first wireless node is considered to be lost, wherein the first wireless node is capable of receiving one or more frames using the first audio or video codec.

41. The apparatus of claim 40, wherein the at least one processor is further configured to:
estimate a link-adaptation rate at which a radio access network responds to radio link-level issues; and
determine a duration of each period of the N periods based at least in part on the estimated link-adaptation rate.

42. The apparatus of claim 41, wherein the N periods are at least an order of magnitude greater than a period corresponding to the estimated link-adaptation rate.

43. The apparatus of claim 40, wherein N is an integer greater than 2, and wherein the frame loss rate in a given period of the N periods is assigned a weight that is greater than a respective weight assigned to the respective frame loss late in each period of the N periods that is prior to the given period.

44. The apparatus of claim 40, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

45. The apparatus of claim 44, wherein the at least one processor is further configured to compare the weighted average frame loss rate to the first threshold and to the second threshold.

46. The apparatus of claim 45, wherein the at least one processor is further configured to receive identification of the second audio or video codec from the second wireless node in response to the feedback.

47. The apparatus of claim 45, wherein the second codec is optimized for a higher transmission rate compared to the first codec if the weighted average frame loss rate is below the second threshold.

48. The apparatus of claim 45, wherein the second codec is optimized for a lower transmission rate compared to the first codec if the weighted average frame loss rate is above the first threshold.

49. The apparatus of claim 45, wherein at least one of the first threshold and the second threshold comprises a hysteresis factor.

50. The apparatus of claim 45, wherein at least one of the first threshold and the second threshold is chosen based on an expected frame loss rate for a codec that is a candidate for a change in codecs.

51. The apparatus of claim 45, wherein the at least one processor is further configured to:
detect a silence mode; and
adjust the weighted average frame loss rate based on the silence mode,
wherein the comparisons of the weighted average frame loss rate to the first threshold and the second threshold are based on the adjusted frame loss rate.

52. The apparatus of claim 51, wherein to adjust the weighted average frame loss rate, the at least one processor is further configured to adjust a number of samples and determining a length of the silence mode.

53. A method of wireless communication, comprising:
transmitting, from a first wireless node, a plurality of frames to a second wireless node using a first audio or video codec in N periods, N being an integer greater than 1;
receiving frame loss rate information, from the second wireless node, responsive to the transmitting, wherein the frame loss rate information is based on a weighted average frame loss rate for the plurality of frames, wherein the weighted average frame loss rate is a weighted sum of N respective frame loss rates of the N periods for the plurality of frames, wherein the weighted average frame loss rate of a first period of the N periods is assigned a weight that is greater than a weight assigned to the weighted average frame loss late of a second period of the N periods that is prior to the first period, wherein the frame loss rate information includes a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold, and wherein a number of frames of the plurality of frames transmitted by the first wireless node that are received at the second wireless node beyond an allowed delay are considered to be lost and a number of frames of the plurality of frames transmitted by the first wireless node using the first audio or video codec that are not received at the second wireless node are considered to be lost, wherein the second wireless node is capable of receiving one or more frames using the first audio or video codec;
selecting the second audio or video codec, based at least in part on the frame loss rate information, and
transmitting a second plurality of frames to the second wireless node using the second codec, wherein the first audio or video codec and the second audio or video codec are optimized for different transmission rates.

54. The method of claim 53, wherein the frame loss rate information comprises a request to use the second codec.

55. The method of claim 53, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

56. An apparatus for wireless communication, comprising:
means for transmitting, from a first wireless node, a plurality of frames to a second wireless node using a first audio or video codec in N periods, N being an integer greater than 1;
means for receiving frame loss rate information, from the second wireless node, responsive to the transmitting, wherein the frame loss rate information is based on a weighted average frame loss rate for the plurality of frames, wherein the weighted average frame loss rate is a weighted sum of N respective frame loss rates of the N periods for the plurality of frames, wherein the weighted average frame loss rate of a first period of the N periods is assigned a weight that is greater than a weight assigned to the weighted average frame loss late of a second period of the N periods that is prior to the first period, wherein the frame loss rate information includes a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold, and wherein a number of frames of the plurality of frames transmitted by the first wireless node that are received at the second wireless node beyond an allowed delay are considered to be lost and a number of frames of the plurality of frames transmitted by the first wireless node using the first audio or video codec that are not received at the second wireless node are considered to be lost, wherein the second wireless node is capable of receiving one or more frames using the first audio or video codec;
means for selecting the second audio or video codec, based at least in part on the frame loss rate information, and
means for transmitting a second plurality of frames to the second wireless node using the second codec, wherein the first audio or video codec and the second audio or video codec are optimized for different transmission rates.

57. The apparatus of claim 56, wherein the frame loss rate information comprises a request to use the second codec.

58. The apparatus of claim 56, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

59. A non-transitory computer-readable medium comprising code to:
transmit, from a first wireless node, a plurality of frames to a second wireless node using a first audio or video codec in N periods, N being an integer greater than 1;
receive frame loss rate information from the second wireless node responsive to the transmitting, wherein the frame loss rate information is based on a weighted average frame loss rate for the plurality of frames, wherein the weighted average frame loss rate is a weighted sum of N respective frame loss rates of the N periods for the plurality of frames, wherein the weighted average frame loss rate of a first period of the N periods is assigned a weight that is greater than a weight assigned to the weighted average frame loss late of a second period of the N periods that is prior to the first period, wherein the frame loss rate information includes a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold, and wherein a number of frames of the plurality of frames transmitted by the first wireless node that are received at the second wireless node beyond an allowed delay are considered to be lost and a number of frames of the plurality of frames transmitted by the first wireless node using the first audio or video codec that are not received at the second wireless node are considered to be lost, wherein the second wireless node is capable of receiving one or more frames using the first audio or video codec;
select the second audio or video codec, based at least in part on the frame loss rate information; and
transmit a second plurality of frames to the second wireless node using the second audio or video codec, wherein the first audio or video codec and the second audio or video codec are optimized for different transmission rates.

60. The non-transitory computer-readable medium of claim 59, wherein the frame loss rate information comprises a request to use the second codec.

61. The non-transitory computer-readable medium of claim 59, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

62. An apparatus for wireless communication, comprising:
a memory; and
at least one processor coupled to the memory and configured to:
transmit, from a first wireless node, a plurality of frames to a second wireless node using a first audio or video codec;
receive frame loss rate information from the second wireless node responsive to the transmitting, wherein the frame loss rate information is based on a weighted average frame loss rate for the plurality of frames, wherein the weighted average frame loss rate is a weighted sum of N respective frame loss rates of the N periods for the plurality of frames, wherein the weighted average frame loss rate of a first period of the N periods is assigned a weight that is greater than a weight assigned to the weighted average frame loss late of a second period of the N periods that is prior to the first period, wherein the frame loss rate information includes a result of a determination that the weighted average frame loss rate is above a first threshold when a second audio or video codec to be used has a second codec rate lower than the first codec rate, the first threshold being selected such that a quality evaluation of using the first audio or video codec at a frame loss rate corresponding to the first threshold is less than or equal to a quality evaluation of using the second audio or video codec at a frame loss rate lower than the first threshold, and wherein a number of frames of the plurality of frames transmitted by the first wireless node that are received at the second wireless node beyond an allowed delay are considered to be lost and a number of frames of the plurality of frames transmitted by the first wireless node using the first audio or video codec that are not received at the second wireless node are considered to be lost, wherein the second wireless node is capable of receiving one or more frames using the first audio or video codec;

select the second audio or video codec, based at least in part on the frame loss rate information; and transmit a second plurality of frames to the second wireless node using the second audio or video codec, wherein the first audio or video codec and the second audio or video codec are optimized for different transmission rates.

63. The apparatus of claim 62, wherein the frame loss rate information comprises a request to use the second codec.

64. The apparatus of claim 62, wherein the feedback includes a result of a determination that the weighted average frame loss rate is below a second threshold when the second codec rate is higher than the first codec rate, the second threshold being selected such that a quality evaluation of using the first audio or video codec at a frame loss rate corresponding to the second threshold is less than or equal to a quality evaluation of using the second audio or video codec at a frame loss rate higher than the first threshold frame.

* * * * *